Dec. 4, 1928.
T. McQUAIN
1,693,852
CONCRETE MOLDING MACHINE
Filed Aug. 9, 1927
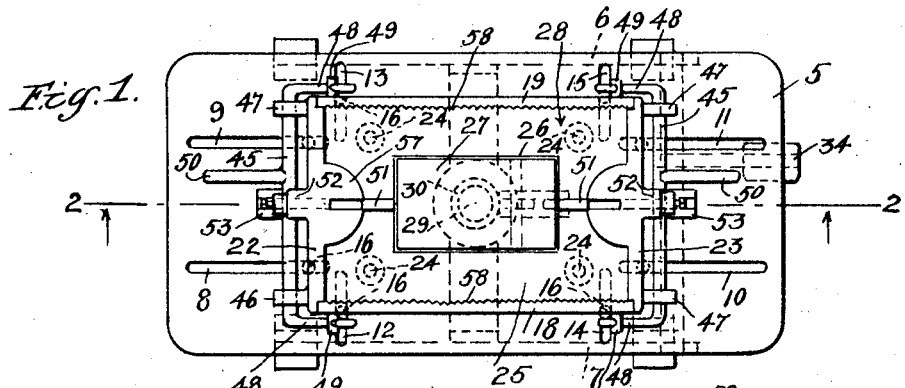
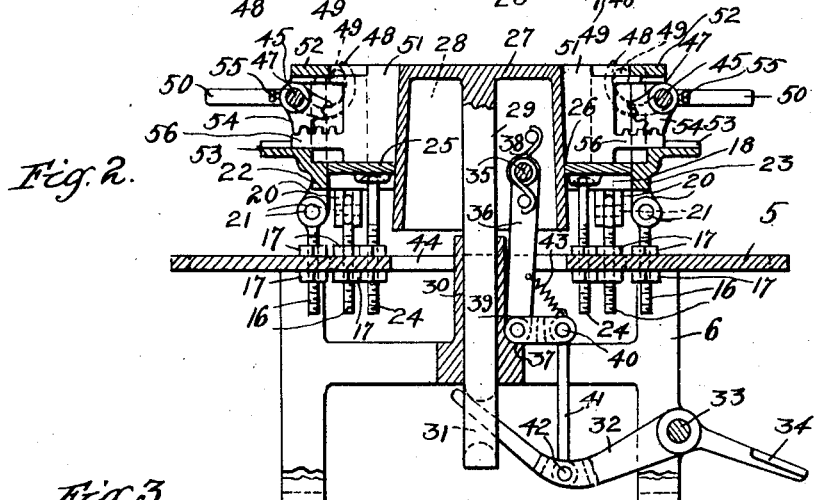
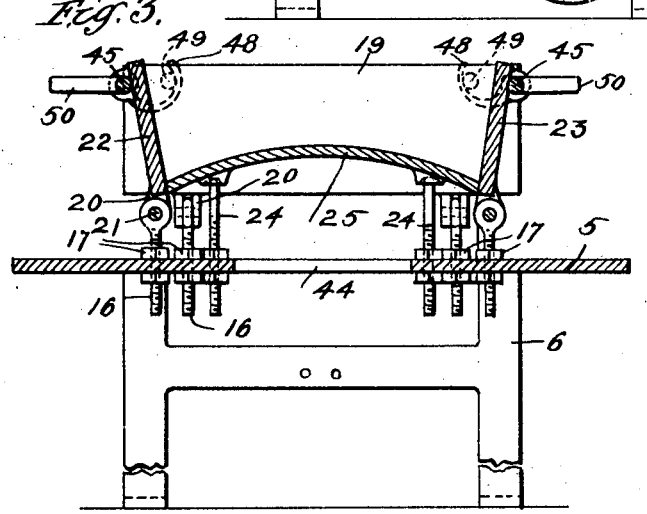
INVENTOR
Thomas McQuain
BY
Robt. D. Pearson
ATTORNEY Patented Dec. 4, 1928.

1,693,852

UNITED STATES PATENT OFFICE.

THOMAS McQUAIN, OF OCEAN PARK, CALIFORNIA.

CONCRETE-MOLDING MACHINE.

Application filed August 9, 1927. Serial No. 211,807.

This invention relates to cement block molding machines and pertains to a machine whereby blocks, composed of cement or other material, of many desired sizes and configurations may be expeditiously and efficiently molded.

The above mentioned and other objects of the invention will be more fully disclosed in the following specifications and will be exemplified in the accompanying drawings, in which:

Figure 1 is a plan view of a molding machine embodying the general feature of the invention.

Figure 2 is a longitudinal vertical section thereof taken on the line 2—2 of Figure 1.

Figure 3 is a similar view to that of Figure 2 illustrating how wedge shaped arch blocks may be formed on the machine.

In carrying out the invention, the machine comprises a base or table 5 which is supported on suitable leg frames 6 and 7. The table 5 is provided with a pair of oppositely and longitudinally disposed slots 8 and 9 at one of its ends and corresponding slots 10 and 11 at its opposite end and with a pair of transversely disposed slots 12 and 13 at one of its ends and a pair transversely disposed slots 14 and 15 at its opposite end.

Mounted in each of the above mentioned slots is an eye bolt 16 which constitutes a hinge member, adapted to be adjusted vertically in the slots or longitudinally and transversely along the slots, and to be held in their adjusted position by means of the nuts 17 disposed above and below the surfaces of table 5 and threaded on to said bolts as shown.

Side wall members 18 and 19 are hinged respectively to the bolts 16 disposed in slots 12 and 14 and the bolts 16 disposed in slots 13 and 15, the side wall member being provided with ears 20 which straddle the eyes of the bolts 16 and with apertures which register therewith through which the pins 21 pass, thus hinging the sides to the bolts.

End wall members 22 and 23 are hinged respectively to the bolts 16 in slots 8 and 9 and 10 and 11 in a similar manner to that of sides 18 and 19.

Disposed in apertures formed in table 5 are the bolts 24 which are adapted for vertical adjustment with respect to said table, nuts being threaded on to said bolts and engaging with the top and bottom surfaces of the table for that purpose.

Supported on the upper ends of bolts 24 is a bottom wall member 25 which is disposed between the side and end wall members 18 and 19 and 22 and 23.

When it is desired to form a hollow block or one having cavity therein, the bottom wall member 25 is provided with a centrally disposed aperture 26 for the reception of a core 27 adapted to be projected upwardly into the molding chamber 28 formed between the side and end wall members and the bottom wall member.

The core 27 is provided with a downwardly projecting stem 29 which is adapted to reciprocate in a sleeve 30 secured to the leg frames 6 and 7 and is provided at its lower end with a slot 31 adapted to receive one end of a lever 32 which is secured at its opposite end to a rod 33 pivoted to the frame legs. Secured to rod 33 is a foot lever 34, by a manipulation of which the core 27 may be raised or lowered.

In order that the core may be latched and held in position the following mechanism is provided. Pivoted to the core at 35 is a lever 36 the lower end of which is adapted to rest upon a ledge 37 on the frame legs 6 and 7, said lever being pressed inwardly toward said ledge and held in engagement therewith by a spring 38. Pivoted to the lower end of lever 36 is a link 39 which in turn is pivoted at 40 to one end of a rod 41, the other end of said rod being pivoted at 42 to the lever 32 intermediate of its ends. A spring 43 is secured to and between the lever 36 and link 39 and is adapted to yieldingly hold these members at approximately right angles with each other.

The table 5 is provided with an aperture 44 through which the core 27 may pass.

In order that the side and end wall members may be held together firmly to form the molding chamber 28 a rod 45 is provided for each of the end wall members 22 and 23 and as the construction at each end wall member is identical a description of one will suffice for both.

The rod 45 performs the function of a rock shaft and is journaled in bearings 46 and 47 secured to the end wall member and is provided at each of its ends with a hook 48 adapted to engage with pins 49 projecting from the side wall member, said rod being provided with a suitable handle 50 in order that it may be conveniently rocked to engage or disengage the hooks from the pins.

It is sometimes desirable that the molding chamber 28 be partitioned off to form two molding chambers and to this end a slidable partition 51 is mounted in each end wall member adapted to slide in top and bottom guideways 52 and 53 formed on the end wall member and in order that these partitions may be operated simultaneously with the latch hooks 48, a segmental gear 54 may be secured to the rod 45 by means of a set screw 55.

The slide partition is provided with a rack bar 56 which meshes with the segmental gear 54. By this arrangement it will be obvious that when the rod 45 is manipulated to engage the hooks 48 with pins 49 the slide bar will be thrown inwardly toward the core member 27 and when the motion is reversed after a block has been molded the slide bar will be withdrawn from the block and the sides and ends released in order that the finished blocks may be removed.

When it is desired to dispense with the slide partition bar it may be disconnected from the rod 45 by loosening the set screw 55 and then moved until its inner edge is flush with the inner edge of the end wall member when it will remain idle during latching operations.

The internal faces of the side wall member and the end wall members and the bottom wall member may be of many desired configurations, as for instance, the end wall member may be provided with the protuberances 57, the side wall members with the serrations 58 and the bottom may be arched as shown in Figure 3.

When the various parts are in the position shown in the drawings, the cement mixture is poured into the chamber 28 and after it becomes sufficiently set, the foot lever 34 may be kicked up thus releasing the lever 36 from engagement with the ledge 37 and then acting to withdraw the core from the block.

The lever 50 may be manipulated to release the hooks 48 and the end and side wall members may be then rocked on their hinges away from the sides of the finished block or blocks.

By hinging the end and side wall members adjacent their lower edges to the eye bolts 16 it will be obvious that they may be tilted as shown in Figure 3 to form wedge shaped blocks and that the bottom wall member may be adjusted vertically to form blocks of any desired depth. When blocks of various dimensions and configurations are to be made it will only be necessary to supply corresponding side end and bottom wall members, and the eye bolts 16 may be adjusted along their respective slots to accommodate these members.

Having thus described my invention what I claim is:

1. A block molding machine comprising a frame; hinge members adapted for longitudinal adjustment on said frame; side wall members hinged to said hinge members; hinge members adapted for adjustment transversely of said frame; end wall members hinged to said second mentioned hinge members; a bottom wall member and means for supporting said bottom wall member on said frame.

2. A block molding machine comprising a frame; two sets of hinge members adapted for longitudinal and vertical adjustment on said frame; side wall members hinged to said hinge members; two sets of hinge members adapted for transverse and vertical adjustment on said frame; end wall members hinged to said hinge members; a bottom wall member adapted for vertical adjustment with respect to said frame; a core member mounted on said frame adapted for vertical adjustment therewith and means for latching said side and end wall members together to form a molding chamber.

3. A block molding machine comprising a table provided with longitudinally and transversely disposed slots; eye bolts constituting hinge members disposed in said slots; side and end wall members hinged to said eye bolts and nuts on said eye bolts disposed above and below said table, whereby said bolts may be adjusted vertically and along their respective slots and secured in their adjusted position by means of said nuts.

4. A block molding machine comprising a frame, side wall members and end wall members hinged to said frame, a bottom member, slidable partitions mounted on said end wall members to slide into and out of the mold chamber, and means for sliding said partitions.

5. A block molding machine comprising a frame, side wall members and end wall members hinged to said frame, a bottom member, slidable partitions mounted on said end wall members to slide into and out of the mold chamber, racks on said partitions, rock shafts, segmental pinions on said rock shafts in mesh with said racks, and means for rocking said shafts to cause said pinions to engage said racks to slide said racks together with said partitions.

In testimony whereof I hereunto affix my signature.

THOMAS McQUAIN.